Figure 1:
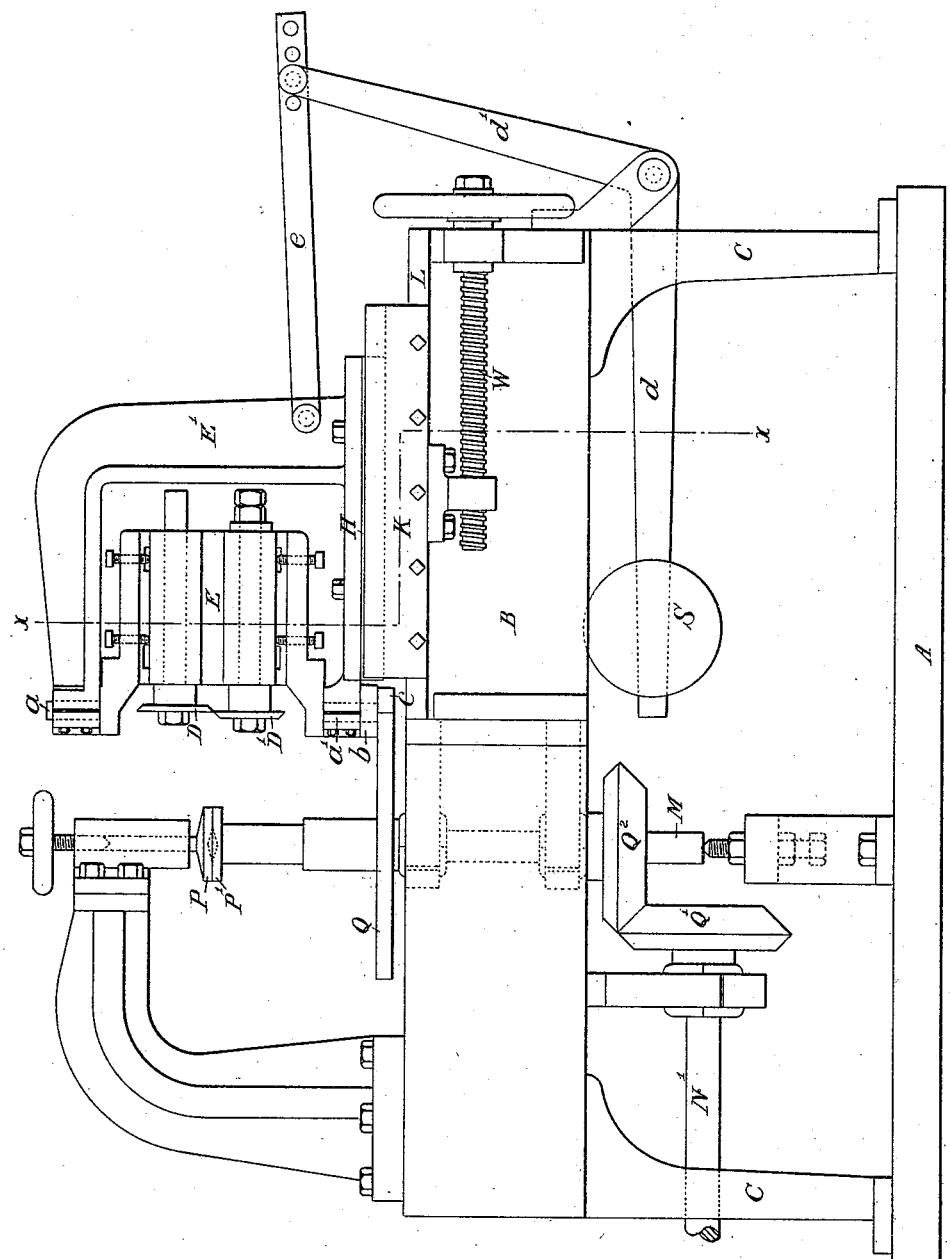

(No Model.)

2 Sheets—Sheet 1.

C. WILLIS.
MACHINE FOR CUTTING SHEET METAL.

No. 446,241. Patented Feb. 10, 1891.

Witnesses:

Inventor:
Charles Willis (No Model.) 2 Sheets—Sheet 2.
C. WILLIS.
MACHINE FOR CUTTING SHEET METAL.
No. 446,241. Patented Feb. 10, 1891.
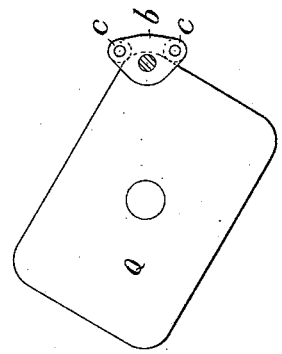
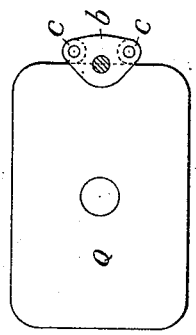
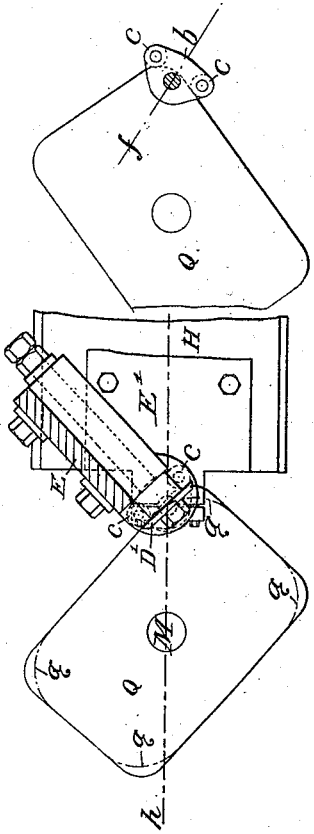
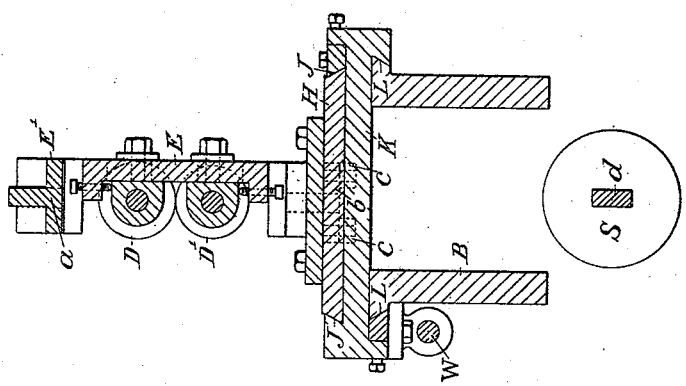
Witnesses:
Inventor:
Charles Willis
By Henry Connett
Atty.

UNITED STATES PATENT OFFICE.

CHARLES WILLIS, OF BIRMINGHAM, ENGLAND, ASSIGNOR TO J. H. HOPKINS & SONS, LIMITED, OF SAME PLACE.

MACHINE FOR CUTTING SHEET METAL.

SPECIFICATION forming part of Letters Patent No. 446,241, dated February 10, 1891.

Application filed September 30, 1890. Serial No. 366,634. (No model.)

*To all whom it may concern:*

Be it known that I, CHARLES WILLIS, a subject of the Queen of Great Britain, and a resident of Birmingham, in the county of Warwick, England, have invented certain Improvements in Machines for Cutting Sheet Metal and other Sheet Material, of which the following is a specification.

My invention relates in the main to that class of machines now employed for cutting or shearing sheet-metal blanks of various shapes and for trimming up articles made from sheet metal. In this class of machines the material or article to be cut or trimmed is held by holders on a rotating spindle and is turned about so as to present itself to the cutters, the position of the cutters being controlled by a "former" or shaper which rotates with the spindle and has the form of the blank to be cut. Such a machine is described in the British patent granted to Alfred Nind Hopkins, No. 1804, dated April 10, 1883.

My invention has for its object means whereby the rotary disk cutters of such a machine shall be turned automatically about the cutting-point during the cutting operation and held so that they will always be in position to cut in a line tangential to the periphery of the blank which is being cut or the article which is being trimmed, or approximately so—that is to say, in a line at right angles to or approximately to a straight line drawn from the axis of the carrying-spindle to the point where the cutting operation is going on.

The purpose of the invention is to avoid the tendency to tear the metal or material, such as is experienced with cutters which are merely moved toward and from the spindle which carries the material being cut in a direct line. In such machines the tendency to tearing is due to the cutters cutting portions of the edge while in a position oblique thereto.

My invention will be fully described hereinafter, and its novel features carefully defined in the claims.

In the accompanying drawings, which serve to illustrate the invention, Figure 1 is a side elevation of a machine of the character described with my improvements applied thereto, and Fig. 2 is a transverse section of the same in the plane indicated by the line $x\,x$ in Fig. 1. Figs. 3, 4, and 5 are detached plan views of the former or shaper, showing it and adjacent parts in three different positions, as will be hereinafter described; and Fig. 6 is a sectional plan view illustrating the automatic adjustment of the cutters with respect to the shaper, as will be hereinafter described.

A is a foundation-plate, and B is the bed-plate of the machine, supported on said plate by legs or standards C.

The holder-spindle M, which carries the blank or article to be trimmed or cut, is mounted in suitable bearings and is driven from a shaft N' through the medium of the gear-wheels Q' $Q^2$. The shaft N' may be driven from any source.

The two parts or disks P P' of the holder, between which the sheet or article to be cut or trimmed is held while being rotated and cut, are of the usual kind employed in rotary cutting-machines, and the outer or upper disk P is drawn back or raised by the usual or any suitable means. A pair of ordinary rotary disk cutters D D' are mounted in the usual manner in a frame E; but according to this invention the frame E is mounted on pivots $a$ and $a'$ (the latter pivot being represented by dotted lines only) in the forward end of a sliding frame E' in such a manner that the frame E is capable of vibrating or swinging sidewise on its pivots. The frame E' is mounted on a plate H, which slides in guides or keepers J on a saddle K, and this saddle is mounted to slide on guides L on the bed-plate B. The saddle K may be adjusted into any desired position along the bed by means of a screw W or by any other convenient device, and it remains in such position while the machine is at work; but the frame E' is free to slide to and fro on the saddle while the machine is at work. A former or shaper Q is fixed on the holder-spindle M and rotates therewith. The lower pivot $a'$ of the cutter-frame E is prolonged downward beyond its bearing and carries a piece or head $b$, in which are fixed two bearing-studs $c\,c$, arranged on opposite sides of the axis of the pivot $a'$. The sliding frame E' is kept constantly pressed inward or toward the spindle M with a yielding pressure, and this is effected, preferably, by a weight S on an elbow-lever $d$ $d'$. The upper arm of this lever is coupled to the frame E' by a connecting-rod $e$. Thus the studs $c$ (which may carry friction-rollers) are kept pressed up to a bearing on the edge of the shaper Q, which is set in the same plane with said studs. As the spindle M rotates, the shaper, which may be of an irregular or cam-like form, may press the frame E' away from the spindle M, the weight S yielding to the pressure and rising, and as the shaper recedes said weight falls again. Thus the shape of the article cut by the cutters will be governed by the form or contour of the shaper that may be employed.

It will be seen by reference to Fig. 1 that the cutting-plane of the cutters D D' coincides with a plane passing through the axes of the pivots $a$ and $a'$, so that when the cutter-frame E turns about its pivots the cutting-point is not changed, but the cutting-plane turns about this point. This cutting-plane is also tangent to the front or bearing faces of the studs $c$ $c$. The cutting-plane, it will be understood, is a plane which coincides with the juxtaposed faces of the cutting-disks, and the cutting-point is where the two cutting-disks come together.

The studs $c$ $c$, as will be seen by reference to the explanatory views, Figs. 3, 4, and 5, not only serve to convey the outward thrust of the shaper Q to the sliding frame E' and to limit the inward movement of said frame, but they also vibrate or swing the cutter-frame E on its pivots, as required, to an extent sufficient to keep the cutting-plane tangent to the periphery of the blank or other article to be cut or trimmed; or, in other words, these studs hold the cutter-frame E at all times in such a position that a plane passing through both pivots $a$ and $a'$ and through the cutting-point will be at a right angle, or approximately so, with a straight line drawn from the axis of the holder-spindle M to the point at which the cutting is going on.

The shaper Q (shown in the drawings) has the form of an oblong quadrilateral with rounded corners, and in Fig. 6 the pivoted cutter-frame E is shown in the oblique position it will assume with reference to a line $h$ through the axis of the sliding frame E' when the shaper is presented to the studs $c$ $c$, as seen in the figure. When so presented, one stud bears on the straight edge of the shaper and the other on the rounded corner. When the shaper is presented to the bearing-studs, as represented in Figs. 3 and 4, the axes of the cutter-frame E and sliding frame E' will coincide.

Fig. 5 shows the angle of obliquity of the two frames when one stud $c$ has passed off from the rounded corner of the shaper and the other stud is just coming on. This position is substantially the reverse of that seen in Fig. 6.

In Fig. 5, $f$ is a broken line indicating the axis of the cutter-frame E.

The contour of the shaper Q is not exactly that of the blank or article to be trimmed, as the pair of studs $c$ allow the cutters to approach nearer to the spindle M when a rounded part of the edge of the shaper is presented to them than when such portion is presented to a single stud or roller, as used, for example, in the machine of the Hopkins patent before mentioned, in consequence of such salient portion of the edge of the shaper projecting more or less into the space between the two studs. This may be clearly seen in Fig. 4, and in Fig. 6 the difference in contour of the piece cut from that of the shaper is indicated by the curves $g$ in broken lines.

In illustrating and describing my invention I have taken as a type of the machine to which my invention relates the machine described in the before-mentioned British patent of Hopkins and have shown my improvements applied to one of his machines, using the same letters of reference, as far as possible, that are employed in said patent to designate the parts of the machine. These old features I do not, of course, claim. The features that I have invented and applied to said machine consist in the means for automatically adjusting the cutters to the line to be cut by the vibration of the frame in which they are carried.

The holder-disks P P' are shown closed in Fig. 1 in position to clamp a thin flat plate or sheet; but their position will, of course, be altered vertically when used to hold an article to be trimmed—as a pie-dish, for example.

As a means for exerting a yielding pressure on the frame E' to keep the studs or rollers $c$ up to the shaper Q, a spring would be an obvious equivalent of the weight S; but I prefer the weight.

Other sheet materials—such as stiff pasteboard, for example—may be cut on a machine embodying my invention; but it is especially intended for cutting, shearing, and trimming sheet metals.

Having thus described my invention, I claim—

1. In a machine for cutting or shearing sheet metal and the like, the combination, with the rotating spindle provided with a holder for the material to be cut, of the rotating shaper, the sliding frame in which the cutter-frame is mounted, the said cutter-frame mounted on pivots, the rotating disk cutters mounted on the cutter-frame, and the pair of bearing-studs carried by the cutter-frame and arranged to bear constantly on the edge of the shaper, substantially as and for the purpose set forth.

2. In a machine for cutting or shearing sheet metal and the like, the combination, with the rotating spindle provided with a holder for the material to be cut, of the rotating shaper, the sliding frame, the cutter-frame pivotally mounted in the sliding frame and its pivotal axis coinciding with the cutting-point, the rotary cutters mounted in the cutter-frame, the pair of studs carried by the pivoted cutter-frame and arranged to bear on the edge of the shaper, and means, substantially as described, for keeping the said studs pressed up to the shaper with a yielding pressure, substantially as set forth.

In witness whereof I have hereunto signed my name in the presence of two subscribing witnesses.

CHARLES WILLIS.

Witnesses:
JOHN BAINBRIDGE SCURRAH,
JOHN A. DARBY.